US010681156B1

(12) United States Patent
Abdulhayoglu

(10) Patent No.: US 10,681,156 B1
(45) Date of Patent: Jun. 9, 2020

(54) SYSTEM AND PROCESS FOR CLOUD BASED ANALYTICS

(71) Applicant: Melih Abdulhayoglu, Montclair, NJ (US)

(72) Inventor: Melih Abdulhayoglu, Montclair, NJ (US)

( * ) Notice: Subject to any disclaimer, the term of this patent is extended or adjusted under 35 U.S.C. 154(b) by 84 days.

(21) Appl. No.: 14/802,345

(22) Filed: Jul. 17, 2015

Related U.S. Application Data

(60) Provisional application No. 62/025,575, filed on Jul. 17, 2014.

(51) Int. Cl.
*H04L 29/08* (2006.01)
*H04L 12/26* (2006.01)

(52) U.S. Cl.
CPC ............ *H04L 67/22* (2013.01); *H04L 43/062* (2013.01)

(58) Field of Classification Search
CPC ......... G06F 17/30873; G06F 17/30876; G06F 17/30899; G06F 17/30861; G06F 17/30; G06F 2201/875; G06F 17/30864; G06F 17/30902; G06F 16/9535; H04L 67/02; H04L 67/22; H04L 63/1425; H04L 63/1408; H04L 43/08; H04L 43/062; H04L 67/20; G06Q 30/02
USPC ........................................................ 709/224
See application file for complete search history.

(56) References Cited

U.S. PATENT DOCUMENTS

| | | | | |
|---|---|---|---|---|
| 7,299,457 B2* | 11/2007 | Marshall | ........... | G06F 17/30873 707/E17.111 |
| 7,779,147 B1* | 8/2010 | Wang | ..................... | G06Q 30/02 709/235 |
| 8,869,036 B1* | 10/2014 | Deshpande | ......... | G06F 11/3065 715/736 |
| 2001/0029506 A1* | 10/2001 | Lee | ................... | G06F 17/30864 |
| 2006/0253581 A1* | 11/2006 | Dixon | ............... | G06F 17/30861 709/225 |
| 2006/0271671 A1* | 11/2006 | Hansen | ............. | G06F 17/30899 709/224 |
| 2009/0112976 A1* | 4/2009 | Hutchinson | ......... | H04L 41/5083 709/203 |
| 2013/0073509 A1* | 3/2013 | Burkard | ............ | G06F 17/30864 706/52 |
| 2013/0160120 A1* | 6/2013 | Malaviya | ................ | G06F 21/53 726/23 |
| 2014/0068407 A1* | 3/2014 | Suh | ........................ | G06Q 30/02 715/234 |
| 2014/0279793 A1* | 9/2014 | Wohlstadter | ....... | G06Q 30/0269 706/46 |

* cited by examiner

*Primary Examiner* — Tan Doan
(74) *Attorney, Agent, or Firm* — Joseph P. Aiena

(57) ABSTRACT

There is provided a system and process for showing and delivering to a web site publisher, without requiring the publisher to make any changes in the web site, a list of URLs browsed by users before and after the users land on a given URL. The URLs on the list include the last and next N URLs browsed by users before and after browsing the publisher defined URL. The system and process provides for identifying unique users and total visits statistics for a given URL or composite statistics for multiple URL paths.

4 Claims, 7 Drawing Sheets

SYSTEM AND PROCESS FOR CLOUD BASED ANALYTICS

CROSS REFERENCE TO RELATED APPLICATIONS

This application claims the benefit of and priority to U.S. Provisional Patent Application Ser. No. 62/025,575 which was filed on Jul. 17, 2014 and is incorporated by reference in its entirety herein.

FIELD OF THE INVENTION

The present invention relates to online system(s) and processes for web site publishers to identify channels and paths used to reach web sites by website visitors.

BACKGROUND

Every publisher wants to attract more users and for that he promotes his web sites via different platforms or channels and also he configures his web site in a way that it presents easier navigation to desired services. Whenever any user lands on a web page, to a publisher it shows a success and he is interested in knowing as to what path a user took to get to that page so he could focus on the channel involved. Additionally, the publisher is also interested in knowing how many users dropped out on certain web pages and went outside his web property so that he can analyse if anything is wrong with those web pages.

The above stated objectives are achieved using various web analytics solutions, which require a publisher to add their html code in every web page of publisher's web property and then these solutions can give the full path of user navigation within a publisher web property but if the publisher wants to analyse what external Uniform Resource Locators (URLs) the users browsed before landing to a given URL all solutions are limited to provide just a single immediate external URL from where the user landed on publisher property.

As explained in previous section, all existing analytic solutions are confined to provide insight to user within his own web property and only one URL outside his web property and this limits publisher to understand behaviour of user as what he was actually interested in. If a publisher can have detailed data about URLs visited by users before landing on his web property, he can do a better analysis about dropout rates (i.e. users who browse his site but do not convert). Additionally, all existing solutions also require publisher to modify his web site.

SUMMARY

The present invention overcomes the difficulty mentioned in previous section by letting publisher submit a conversion URL and without requiring to modify his web site, to see all common paths various users took to get to that URL and for each URL in path system computes N entry and exit URLs, so that the publisher can analyse information about any given URL, including possible reasons users may have dropped out of a site and went to some other site. Additionally publisher can also see for a given URL or path as how many unique users browsed that path or URL how many times in a given duration. Publishers can go X level(s) deep to see the user browsing pattern beyond his web property.

In order to achieve this functionality for publisher, the system of present invention creates a client code which can send to system of present invention all URLs browsed by user if he opts in to see behaviour based ads. The client code provides functionality using which user can block $3^{rd}$ party ads. In addition to providing user features of blocking $3^{rd}$ party ads and if user wishes, rather seeing ads from $3^{rd}$ parties, he can also opt in for seeing all ads from system of present invention.

In case user has opted in for behaviour based ads, client code sends all URLs browsed by user and when publisher submits the conversion URL, it computes as who all users browsed publisher submitted URL. After system has identified users who browsed that URL, it computes all unique paths users took to get to conversion URL and for each URL in path system computes N entry and exit URLs, so that publisher can analyse about any given URL possible reasons users may have dropped out of site and went to some other site. As client code is sending all URLs browsed by user, publisher has flexibility to define any conversion URL including but not limited to his own web property.

The present invention includes a process with an online service, where any publisher can input a conversion URL and the process identifies how many different paths users took to get to that conversion URL and each path can have URLs beyond publisher's own web property. This method does not require the publisher to modify his web site for any html code.

For each of URL involved in path, system and process of the present invention also provides top N URLs from where a user entered on each URL, henceforth called entry URLs and also top N URLs to where a user went, henceforth called exit URLs. Whenever the system shows any URL or path, it also shows as how many unique users viewed with total number of views in a given period and the publisher can always go up to X level deep while exploring entry and exit URLs.

BRIEF DESCRIPTION OF THE DRAWINGS

The accompanying drawings illustrate various embodiments of the present system of invention and are part of the specification. The illustrated embodiments are merely examples of the system of present invention and do not limit the scope thereof.

DETAILED DESCRIPTION

Figure 1:
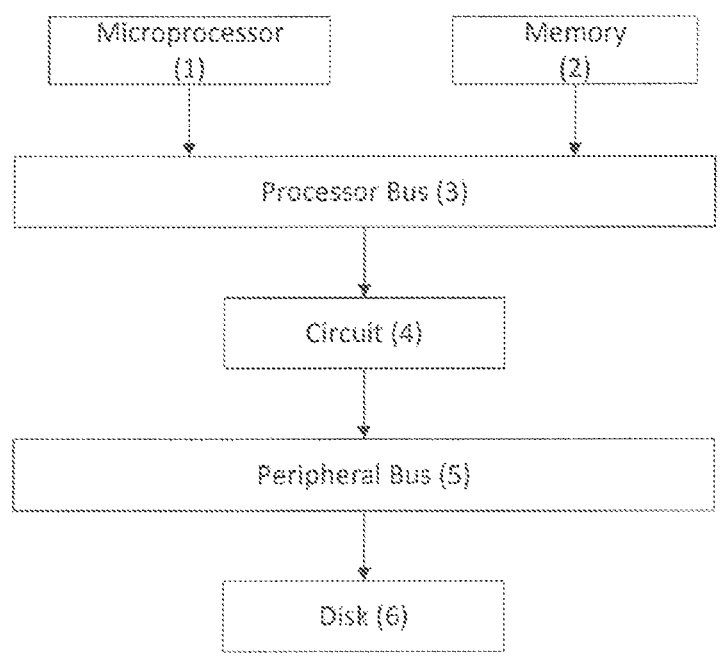
FIG. 1 is a schematic illustration of the connections of a computing system.

FIG. 1 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

Figure 2:
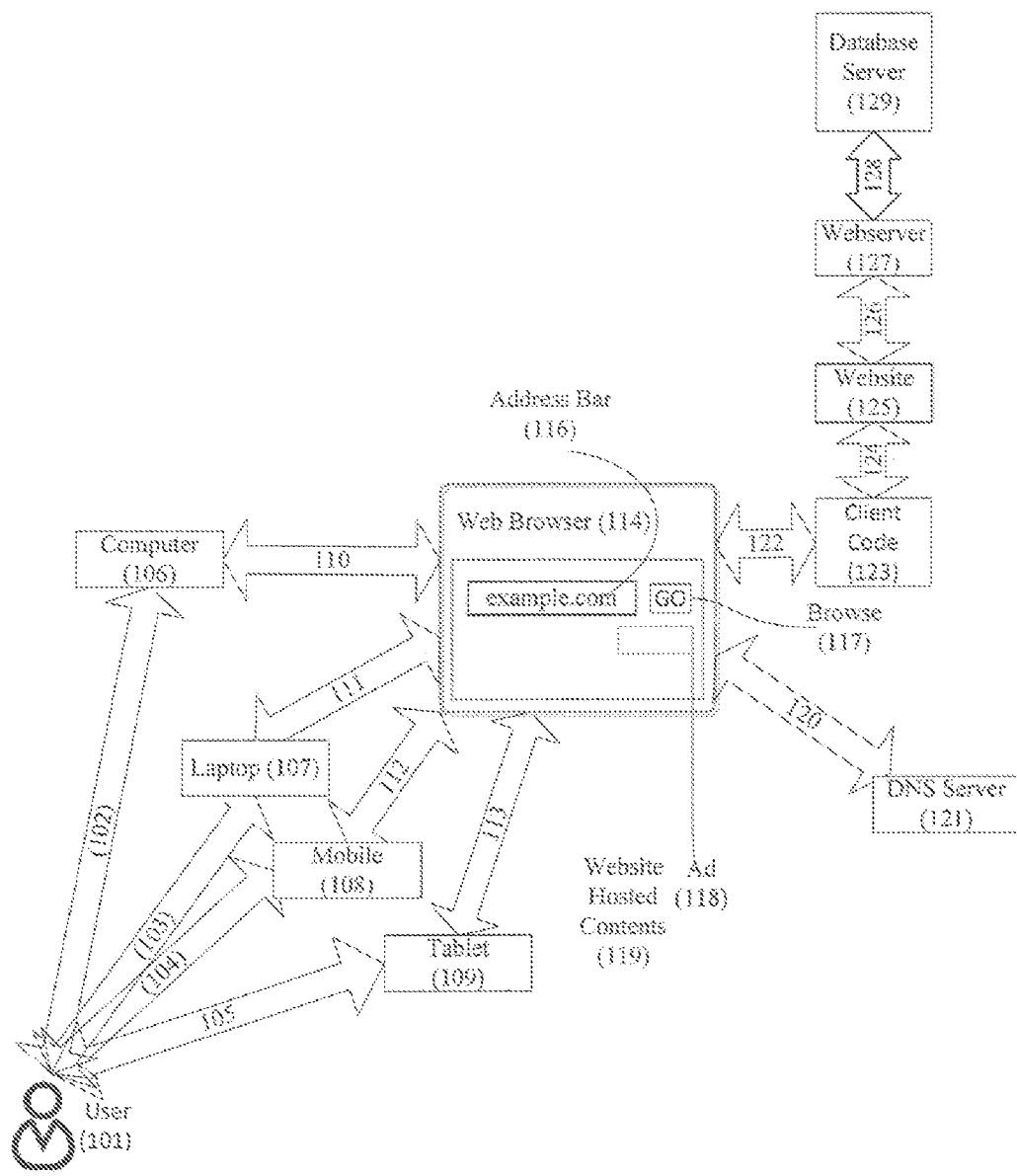
FIG. 2 is a schematic illustration of communication process when the Internet is browsed by a user.

FIG. 2 is a description of how communication works when the web is browsed and it shows that a user (101) can use computer (106), laptop (107), mobile (108) or a tablet (109) to launch a web browser (114) installed on that specific device to browse a specific website (125). User can enter address of some web site on Address Bar (116) and press browser specific option to indicate to browser to browse like shown in above image via button Go (117). After user presses browser specific option to navigate to a given web page as shown in above image via button Go (117), Web Browser (114) first connects to Domain Name Server (121) as configured in that device to resolve web site domain to IP address. Any user initiated request and any request made by code in browser page goes through client code 123 as show via flow 122. Client code has the capability to analyze every passing request and can allow/re-direct or blocks any specific outgoing call. If call is allowed by client code (123), it is received by web server (127) where web site (125) is hosted. Web Server (127) in turn may connect to some Database Server (129) to return specific user requested contents back to Web Browser (114).

Figure 3:
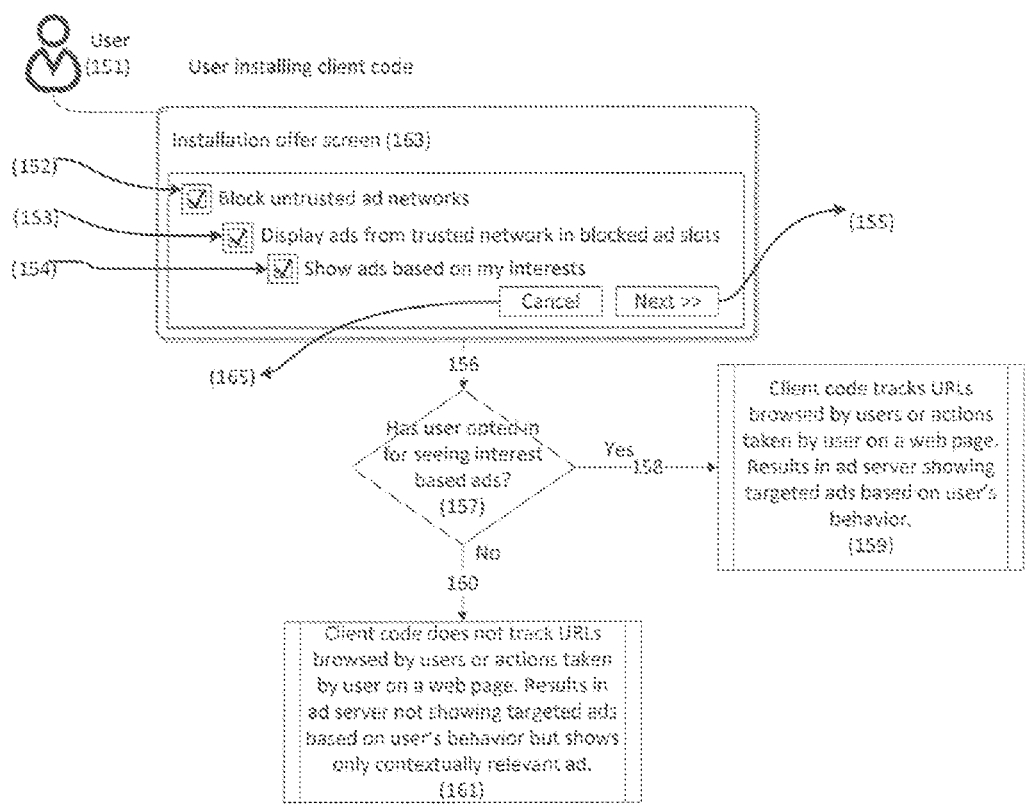
FIG. 3 is a description, where user is offered installation of client code.

FIG. 3 shows a sequence diagram where user 151 is offered client code via offer screen 163, where he is presented option 152 if user wants to block all outgoing calls for $3^{rd}$ party networks when present on a web page. If user opts for option 152, he has further options 153 available to see ads from trusted source rather just blocking $3^{rd}$ party ads and if user opts to see ads via option 153, he has further option 154 to see ads of interest based on his browsing behaviour.

If user is not interested in offer, he can press button 165 and abort the installation and if he wishes to install, he can click button 155 to go to next steps of installation via path 156 where via decision box 157 installer records user selected choice about interests based ads. If user opted in for interest based ads as shown via path 158 decision is recorded in box 159. In case user has not opted for interests based ads as shown via path 160, decision is recorded in box 161. In case user opts for interests based ads, client code sends user browsed URLs and activity on each URL to server including but not limited to total time spent by user on the web page and actions performed on the web page.

Figure 4:
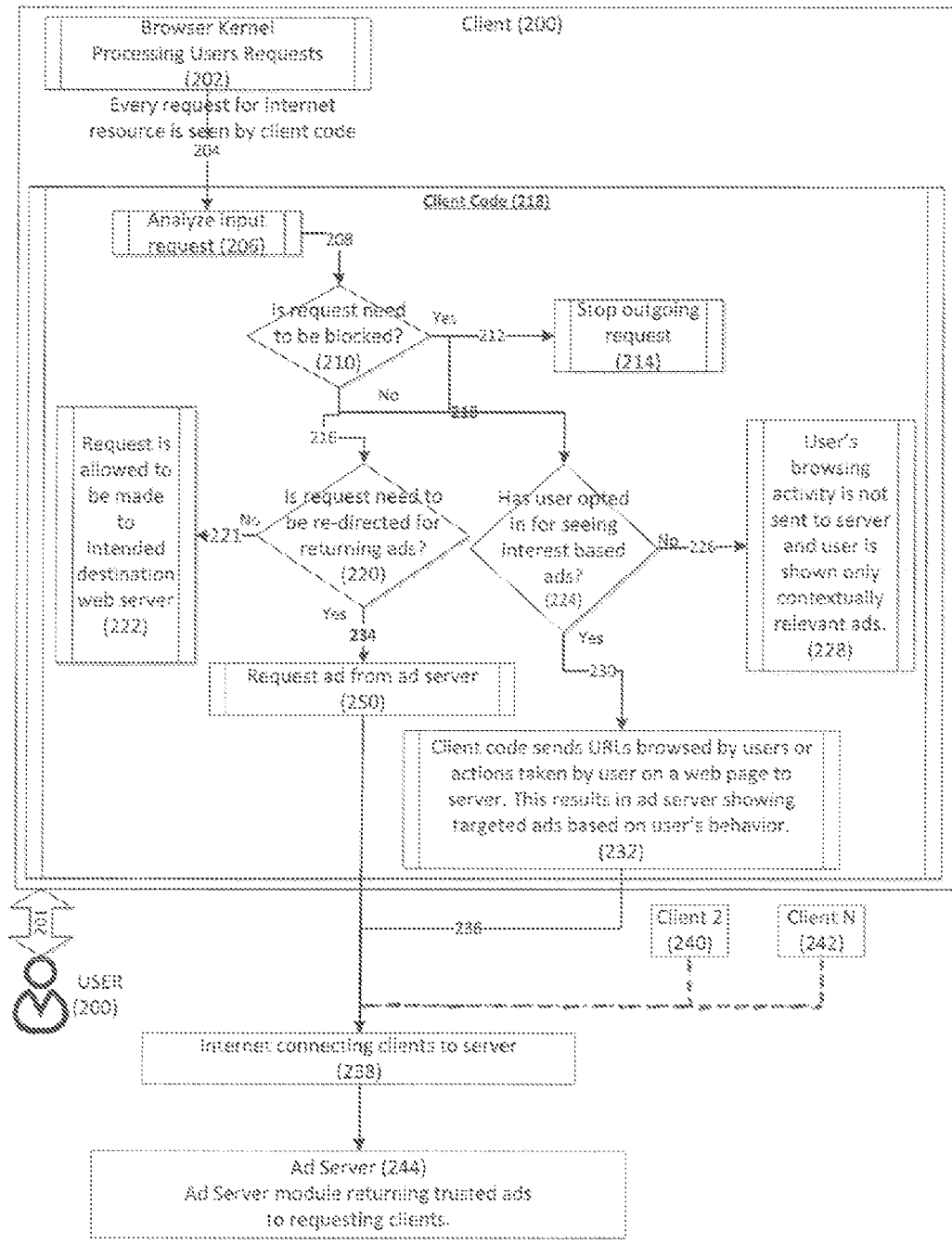
FIG. 4 is a schematic diagram where a user browsing activity is communicated to ad server(s) or blocked at the user's selection.

FIG. 4 is a description of the interaction between a browser and client code where action begins where user 200 initiates a web request as shown via flow 201. After user makes a request, request is captured by browser kernel 202, which processes and sends request further. As client code 218 is installed in this client and every web request is seen by this client code as shown via box 206, where it analyzes each request and based on request, it makes a decision via flow 208 in decision box 210 if request needs to be blocked, if yes, as shown via flow 212, it blocks the request in box 214 at the same time via flow 218, it makes a decision in decision box 224 if user opted in for interest based ads, if user opted in, via flow 230 in box 232 it sends user browsed web page and other activities on web page including but not limited to time user spent on web page, areas he hovered mouse or links he clicked or pages he book marked etc. to ad server 244 via internet connection 238; this way ad server has per user browsed URLs. Ad server 244 is also responsible for returning behavior based ads relevant to user in case he has opted in for it. In case user has not opted for interest based ads, via flow 226 in box 228 it is decided not to send any user browsing related activity to ad server 244.

In case in decision box 210 it is decided that web browser initiated request does not need to be blocked, it is checked further via flow 216 in decision box 220 if request needs to be re-directed or not. If request does not need to be re-directed, it is shown via flow 221 in box 222 that request is sent to its intended target and client code neither blocks nor re-directs request. In case it is decided in decision box 220 that for blocked ad, we need to show trusted ad, via flow 234 and box 250 ad is requested from ad server 244 via Internet connection 238. Ad server 244 is responsible for returning behavior based ads relevant to user in case he has opted in for it.

Figure 5:
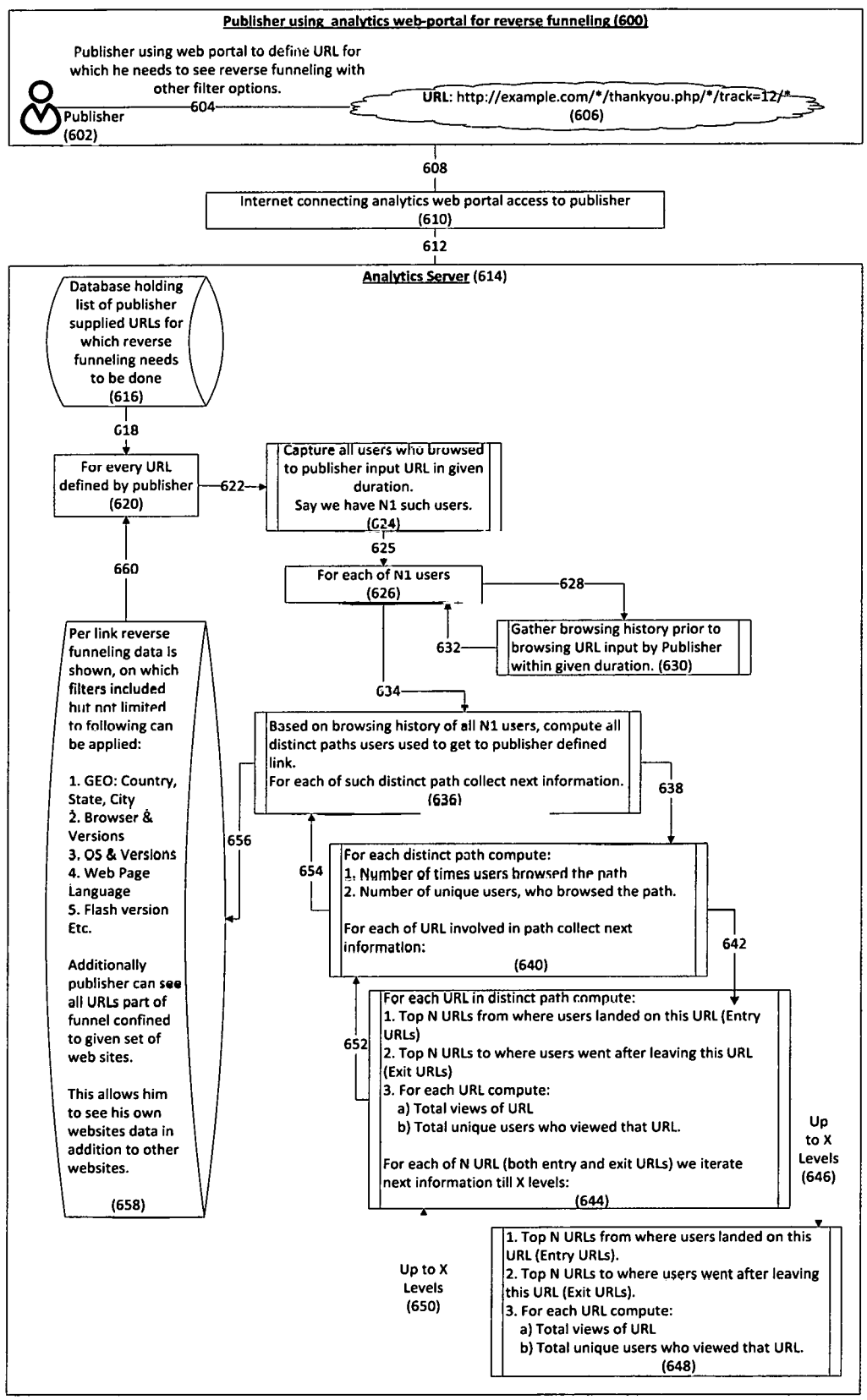
FIG. 5 is an illustration, where a publisher makes use of the system and process of the present invention.

FIG. 5 illustrates a publisher making use of the system and process of the present invention. The publisher submits a conversion URL, which is used to find all common paths browsed by users to get to that URL and then per URL, details of entry and exit URLs are provided. Also provided is the total views and unique users who browsed a given URL or path. Publisher 602 is provided a web interface 606 over Internet, which he accesses via interface 604. In the provided interface, the publisher is expected to input conversion URL for which he needs analytics computed. The conversion URL can be regular expression based.

Referring again to FIG. 5, there is shown a publisher using an analytics web portal for reverse funneling (600). The publisher (602) uses a web portal to define the URL for which he needs to see reverse funneling with other filter options (604), such as a URL (606). As indicated in FIG. 5, the Internet is utilized to connect the analytics web portal access to the publisher (610), which in turn is communicated (612) to an analytics server (614).

Within the analytics server (614), there is the database holding the list of the publisher supplied URLs for which reverse funneling needs to be done. (616). For every URL defined by the publisher (620), the system of the present invention captures all users who browsed to the publisher input URL in a given duration. Such users are a total of N1 users and for each of N1 users, the browsing history is gathered prior to browsing URL input by publisher within a given duration. (Steps 624-630). Steps 626, 630, and 632 show that for each of N1 users, history prior to browsing URL is captured on step 620 is collected. This is then repeated for each of the N1 users (Step 632).

Next, based on the browsing history of all N1 users, the system determines all distinct paths used by the users to reach the publisher-defined link. For each of such distinct path(s), the system collects and determines the following information (636): 1.) the number of times the users browsed the path and 2.) the number of unique users, who browsed the path. For each URL involved in the distinct path collect/compute the next level of information (640), which is communicated back (654) to step 636.

From Step 640, the system accesses (642) and determines, for each URL in a distinct path, the top or most frequent N URLs from where users landed on this URL ("Entry URLs") and the top or most frequent N URLs to where users went after leaving this URL ("Exit URLs"). (Step 644). For each URL of the distinct path, the system and process determines: a) the total views of URL and b) the total unique users who viewed that URL. Then, for each of N URLs, (for both the Entry and Exit URLs), the system iterates the next set of information up until X Levels. (644 and 646).

For each of the X levels (646), the following is determined: 1.) the top (most frequent) N URLs from where users landed on this URL (Entry URLs), 2.) the top (most frequent) N URLs to where users went after leaving this URL (Exit URLs), and 3.) for each URL, determine a.) the total views of the URL and b) the total unique users who viewed that URL. (648). This is then communicated back by the system and process for each of the X levels (650) back to step 644. Likewise, the information and results from Step 644 is communicated back by the process and system (652) to Step 640, which in turn relays the results and determination through that process back to step 636.

All of the information from steps 648, 644, 640 and 636 is communicated via steps 656 and 658. In Step 658, for per link showing reverse funneling data on which filters are included, but not limited to the following, can be applied: 1.) geo-location, such as country, state, and city; 2.) browser and versions; 3.) operating system and versions; 4.) web page language; 5.) flash version, etc. Additionally, the publisher can see all URLs as part of the funnel confined to a given set of web sites. This enables the publisher to see his own website's data in addition to other websites. (658) This is communicated back (660) through the system and can be done for each URL defined by a publisher (Step 620). The system and process does not require the publisher to modify his website for any html code.

All URLs submitted by publisher are stored in database 616 and for every such URL steps from 622 to 660 are iterated as shown via flow 618 in box 620. As a first step via flow 622 in box 624 it is determined as to who all users browsed to given URL. After determination of all users, who browsed given URL, is done, for each of user process 630 is achieved i.e. computing URLs browsed by each of user. Once all URLs from each of user is determined, it is checked via flow 634 in box 636 as what were distinct paths used by all users to reach to publisher defined URL. Once all distinct paths are found, for each distinct path, steps from 638 till 654 are followed, where in box 640 it is identified as to how many distinct users are on a given distinct path and how many times that path is traversed. Then for each of URL involved in each of distinct path steps 642 to 652 are iterated, where via flow 642 in box 644 for each URL from each of distinct path, top N URLs (entry URLs) from where user navigated to this URL determined and also it is determined as to what top N URLs (exit URLs) users went to after leaving this URL, for each of URL total views and total unique users are analyzed and determined as well.

Considering for each of the entry and exit URL(s), we can further determine entry and exit URLs in similar fashion together with associated stats of unique users and views of each URL, we can do this and repeat until the X level as indicated via flow 646 to 650. Thus it allows a publisher to be able to track user entry and exit paths up to the X level to make full sense of his behavior when the user crossed a publisher defined URL.

Figure 6:
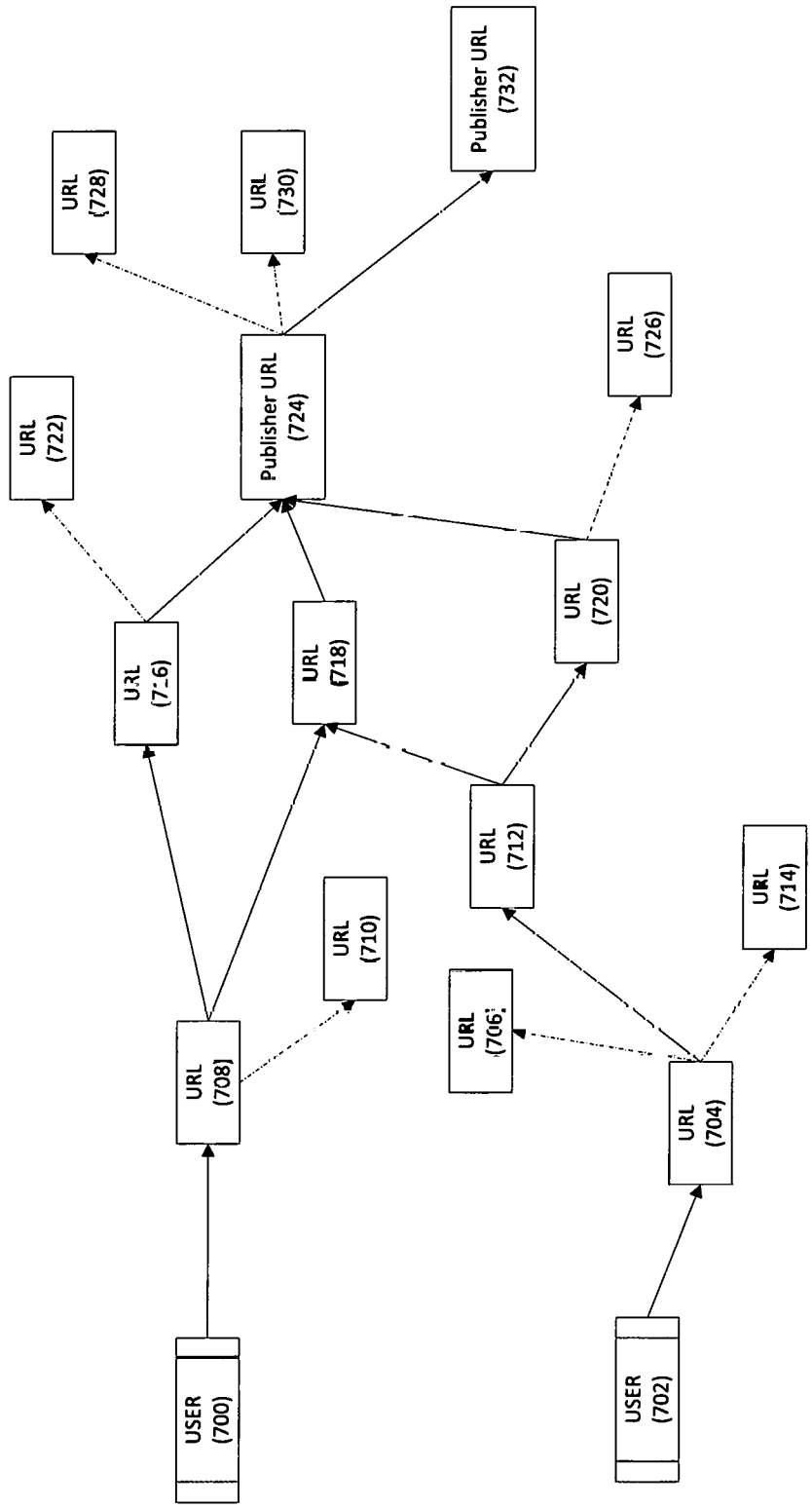
FIG. 6 is a schematic diagram of users' online URL paths to reach a publisher's website.

Referring now to FIG. 6, the diagram presented in FIG. 5 is further described by giving an example of the system and process as users traverse paths to reach a particular publisher's website URL. The dotted lines in FIG. 6 show exit paths where a user leaves the path that he or she could go to the publisher URL, while solid lines represent that somehow they still connect to other URL, which finally end up leading to the user traversing to the publisher URL. FIG. 6 provides an example of how first and second users (700 and 702) reach a path to the same publisher defined URL 724. In FIG. 6, both users 700, 702 can traverse to publisher defined URL 724 via following distinct paths:

Path 1: User 700 traverses a path of URLs indicated by URL 708 to URL 716 to the publisher defined URL 724.

Path 2: User 700 traverses a path of URLs indicated by URL 708 to URL 718 to publisher defined URL 724.

Path 3: User 702 traverses a path of URLs indicated by URL 704 to URL 712 to URL 718 to publisher defined URL 724.

Path 4: User 702 traverse a path of URLs indicated by URL 704 to URL 712 to URL 720 to publisher defined URL 724.

Path 5: Users 700 and 702 each traverse a path of URL 718 to publisher defined URL 724.

With reference now to FIGS. 5 and 6, in FIG. 5, in step 626, the users 700 and 702 for FIG. 6 are identified. Similarly, in FIG. 5, in step box 630, the browsing history of users 700 and 702 are collected. Then in FIG. 5, in step 636 for user 700 Path 1 and 2 of FIG. 6 (and described above) are identified, while similarly for user 702, Paths 3 and 4 of FIG. 6 (and described above) are identified.

In FIG. 5 at step 640, it is determined as how many unique users browsed each of the distinct paths. In following the above example, Path 5 was navigated by two users while the rest of the paths were navigated by one unique user. Assuming each path is browsed just once, the number of times each path is browsed is one for Paths from 1 to 4, while Path 5 is browsed twice.

In FIG. 5, in box 644, each URL of distinct path from FIG. 6 is analyzed i.e. for Path 1 there are two middle URLs 708 and 716. The exit URL for 708 is shown as 710 connected via dotted line—that is, the user diverted from the path there rather than leading to publisher URL. Similarly for URL 716, the exit URL is shown as 722 connected via dotted lines. Inside step 644 of FIG. 5—for determining the first sub-step of step 644, the top N URLs from where users landed on this URL (Entry URLs) for URL 716 will be determined as from by above the example, to be only one URL—just the URL 708.

Continuing the analysis, the second sub-step of Step 644 in FIG. 5 is to determine the top URLs where users went after leaving the URL (Exit URLs). For URL 716, this will be URLs 722 and 724, where URL 722 is an exit URL and while URL 724 is the publisher defined URL. For the third sub-step inside box 644, for each URL it is determined by the system and process of the invention that the total users who viewed the URL and the total views. So, in following the particular example, the system and process determines how many users navigated to URL 716 and how many times. For the above particular example, the answer is by one user (user 700), and one time. If it is determined in similar fashion for URL 718, the answer is two users (both user 700 and user 702), two times.

In similar fashion, each of the entry and exit URLs is analyzed up to X level and the same data is determined as to how many users browsed that URL and how many times and per URL. It is also determined as how many entry and exit URLs were present.

All of the above information can be grouped by user's attributes as to what country user belonged, which operating system he or she was using and what browser was used. Further, for any given URL, the system and process of the present invention can group this information in one of the user attributes and system and websites used by it. The system and process can also group information for URLs of a given web site.

The above diagram of FIG. 6 also shows that a user, after landing onto publisher URL 724, may exit to non-publisher URLs 728 and 730 and the user may navigate to another URL 732 as part of the same publisher website. Therefore, regardless of whether the URL is of the publisher or belongs to some other website, similar information can be collected for the URL as explained above.

Figure 7:
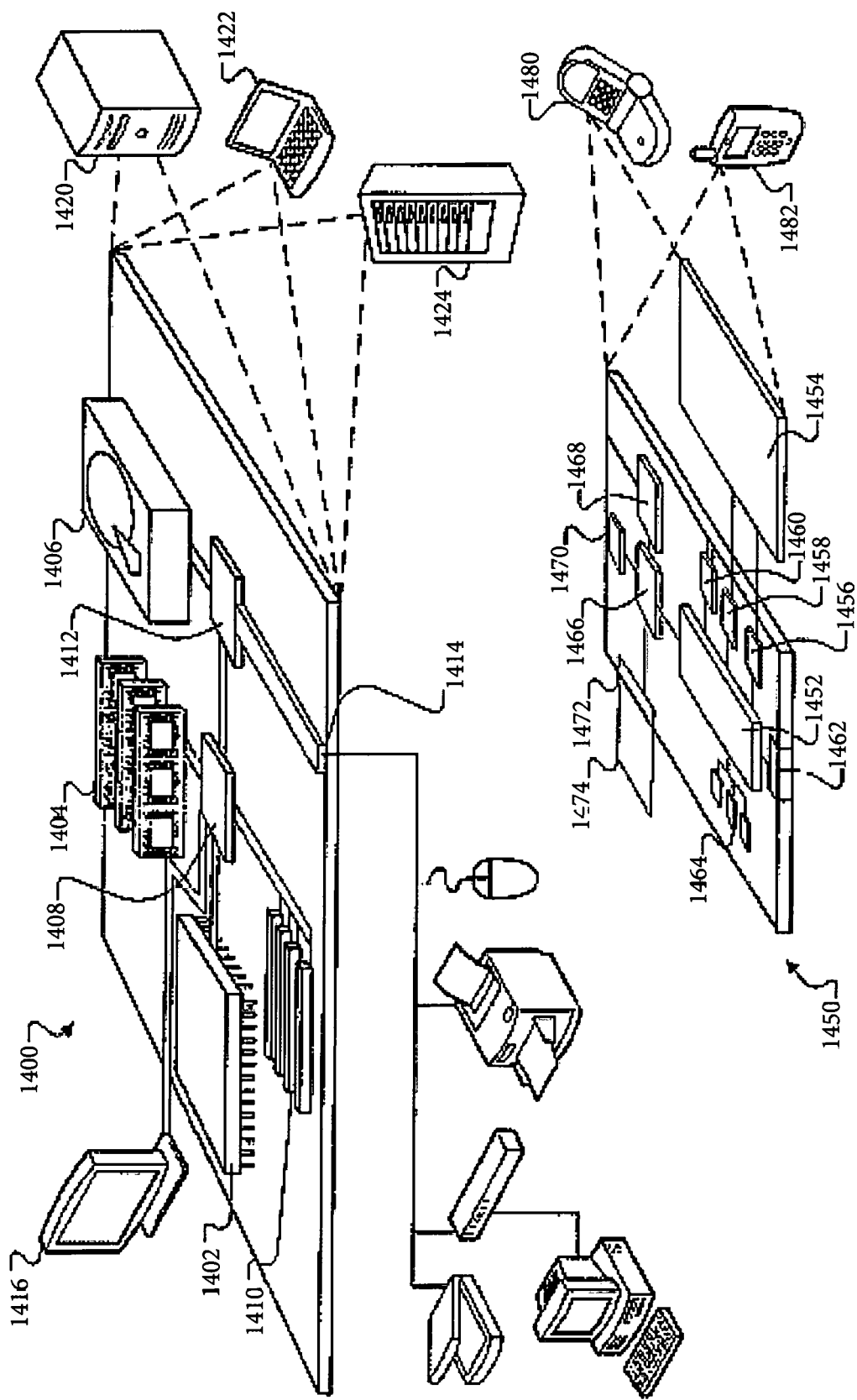
FIG. 7 is an illustration of computer devices and components which are used with the present invention.

FIG. 7 shows an example of a generic computer device 1400 and a generic mobile computer device 1450, which may be used to implement the systems and processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all referencing non-transitory mediums in their nature and definition.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A process comprising:
defining a publisher URL by at least one website publisher using a web portal without modifying a website published by said at least one website publisher;
accessing an online network by a plurality of computing devices and a web browser having a client code for tracking browsed URLs by each of said plurality of computing devices;
said client code blocks untrusted advertisement networks and allows each of said plurality of computing devices to receive behavior based advertisements from a trusted source based on said browsed URLs for each of said plurality of computing devices, said online network having at least one analytics server connecting said web portal with said plurality of computing devices; said at least one analytics server having a database of publisher defined URLs; and said client code sending said browsed URLs to said at least one analytics server;
capturing by said at least one analytics server for each of said publisher defined URLs, all of said plurality of computing devices that browsed to said publisher defined URL;
determining by said at least one analytics server a browsing history prior to browsing said publisher defined URL for each of said captured computing devices;
determining by said at least one analytics server all distinct URL paths said captured computing devices traversed to reach said publisher defined URL;
determining by said at least one analytics server the number of times said captured computing devices accessed each of said distinct URL paths and the number of unique computing devices of said captured computing devices that browsed each of said distinct URL paths;
determining by said at least one analytics server entry URLs and exit URLs for each URL in each of said distinct URL paths;
determining by said at least one analytics server a total amount of views for each URL in said distinct URL path and a total amount of unique computing devices who viewed each URL in said distinct URL path;
repeating by said at least one analytics server for each entry URL and each exit URL, a determination of total views and total unique computing devices up to a predetermined level of X levels deep;
determining, by said at least one analytics server, for each level of said up to a predetermined level of X levels deep, a most frequent entry URL and a most frequent exit URL and
determining, by said at least one analytics server, for each of said most frequent entry URL and each of said most frequent exit URL, total views of said most frequent entry URL and said most frequent exit URL and total unique computing devices that viewed said most frequent entry URL and said most frequent exit URL;
communicating back for each level of said up to a predetermined level of X levels deep said most frequent entry URL, said most frequent exit URL, and said total views and total unique computing devices;
filtering, by said at least one analytics server, for said publisher defined URL said plurality of computing devices;
communicating by said at least one analytics server to said at least one website publisher said entry URLs and said exit URLs of said publisher defined URL.

2. The process of claim 1 further comprising after said communicating step, delivering by said at least one analytics server said behavior based advertisements determined by the browsed URLs from said client code for each of said plurality of computing devices.

3. A system comprising:
at least one website publisher using a web portal to define a publisher URL without modifying a website published by said at least one website publisher;
a plurality of computing devices accessing an online network with a web browser having a client code for tracking browsed URLs by each of said plurality of computing devices, said client code blocks untrusted advertisement networks and allows each of said plurality of computing devices to receive behavior based advertisements from a trusted source based on said browsed URLs for each of said plurality of computing devices, said online network having at least one analytics server connecting said web portal with said plurality of computing devices;
said at least one analytics server having a database of publisher defined URLs, and said client code sending said browsed URLs to said at least one analytics server;
for each of said publisher defined URLs, said at least one analytics server capturing all of said plurality of computing devices that browsed to said publisher defined URL;
said at least one analytics server determining a browsing history prior to browsing said publisher defined URL for each of said captured computing devices;
said at least one analytics server determining all distinct URL paths said captured computing devices traversed to reach said publisher defined URL;
said at least one analytics server determining the number of times said captured computing devices accessed each of said distinct URL paths and the number of unique computing devices of said captured computing devices that browsed each of said distinct URL paths;
said at least one analytics server determining entry URLs and exit URLs for each URL in each of said distinct URL paths;
said at least one analytics server determining a total amount of views for each URL in said distinct URL path and a total amount of unique computing devices who viewed each URL in said distinct URL path;

said at least one analytics server, for each entry URL and each exit URL, repeating a determination of total views and total unique computing devices up to a predetermined level of X levels deep;

said at least one analytics server, for each level of said up to a predetermined level of X levels deep, determining a most frequent entry URL and a most frequent exit URL and said at least one analytics server, for each of said most frequent entry URL and each of said most frequent exit URL, determining total views of said most frequent entry URL and said most frequent exit URL and total unique computing devices that viewed said most frequent entry URL and said most frequent exit URL;

said at least one analytics server communicating back for each level of said up to a predetermined level of X levels deep, said most frequent entry URL, said most frequent exit URL, and said total views and total unique computing devices;

said at least one analytics server filtering for said publisher defined URL said plurality of computing devices;

said at least one analytics server communicating to said at least one website publisher said entry URLs and said exit URLs of said publisher defined URL.

4. The system of claim 3 wherein said at least one analytics server delivers said behavior based advertisements determined by the browsed URLs from said client code for each of said plurality of computing devices.

\* \* \* \* \*